US010672168B1

(12) United States Patent
Hu et al.

(10) Patent No.: US 10,672,168 B1
(45) Date of Patent: *Jun. 2, 2020

(54) ANNOTATING AN IMAGE WITH A TEXTURE FILL

(71) Applicant: Snap Inc., Santa Monica, CA (US)

(72) Inventors: Nan Hu, San Jose, CA (US); Xing Mei, Los Angeles, CA (US); Chongyang Ma, Los Angeles, CA (US); Kun Duan, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,475

(22) Filed: Aug. 1, 2019

Related U.S. Application Data

(63) Continuation of application No. 15/850,989, filed on Dec. 21, 2017, now Pat. No. 10,430,987.

(60) Provisional application No. 62/517,510, filed on Jun. 9, 2017.

(51) Int. Cl.
*G06T 11/00* (2006.01)
*G06T 11/60* (2006.01)
*G06Q 50/00* (2012.01)
*H04L 12/58* (2006.01)
*G06T 7/149* (2017.01)

(52) U.S. Cl.
CPC .............. *G06T 11/60* (2013.01); *G06Q 50/01* (2013.01); *G06T 7/149* (2017.01); *H04L 51/32* (2013.01)

(58) Field of Classification Search
None
See application file for complete search history.

(56) References Cited

U.S. PATENT DOCUMENTS

| 6,707,458 | B1* | 3/2004 | Leather | G06T 15/04 345/582 |
| 6,888,544 | B2* | 5/2005 | Malzbender | G06T 15/04 345/423 |
| 7,002,591 | B1* | 2/2006 | Leather | G06T 15/005 345/428 |

(Continued)

OTHER PUBLICATIONS

"U.S. Appl. No. 15/850,989, Non Final Office Action dated Nov. 19, 2018", 8 pgs.

(Continued)

*Primary Examiner* — Martin Mushambo
(74) *Attorney, Agent, or Firm* — Schwegman Lundberg & Woessner, P.A.

(57) ABSTRACT

Various embodiments provide for systems, methods, and computer-readable storage media for annotating a digital image with a texture fill. An annotation system may receive a user input defining a border separating a first portion of a target digital image from a second portion of the target digital image. The annotation system may then generate a contour mask, such as a binary mask, for the target digital image based on the user-defined border. The annotation system may then apply a media overlay to the target image based on the contour mask. In particular, the contour mask can define portions of the target digital image such that the annotation system will apply a media overlay to at least one of those portions while not applying the media overlay to remaining portions of the target digital image.

20 Claims, 11 Drawing Sheets

(56) References Cited

U.S. PATENT DOCUMENTS

| | | | | |
|---|---|---|---|---|
| 7,503,653 | B2* | 3/2009 | Endrikhovski | G06F 3/013 345/619 |
| 8,068,117 | B2* | 11/2011 | Lefebvre | G06T 11/001 345/582 |
| 8,243,065 | B2* | 8/2012 | Kim | G01C 21/3638 345/419 |
| 8,432,414 | B2* | 4/2013 | Vetterli | G01C 21/20 345/632 |
| 8,675,016 | B2* | 3/2014 | Vetterli | G01C 21/20 345/632 |
| 8,724,928 | B2* | 5/2014 | Deever | G06T 3/4076 382/299 |
| 9,076,228 | B2* | 7/2015 | Mochizuki | G06T 3/40 |
| 9,552,667 | B2* | 1/2017 | He | |
| 10,430,987 | B1 | 10/2019 | Hu et al. | |
| 2001/0024525 | A1* | 9/2001 | Hata | H04N 1/411 382/238 |
| 2002/0145616 | A1* | 10/2002 | Doan | G06T 11/40 345/629 |
| 2002/0171660 | A1* | 11/2002 | Luo | G06T 11/001 345/582 |
| 2003/0164838 | A1* | 9/2003 | Guo | G06T 11/001 345/582 |
| 2003/0206176 | A1* | 11/2003 | Ritter | G06T 11/001 345/582 |
| 2005/0041842 | A1* | 2/2005 | Frakes | G06K 9/3216 382/128 |
| 2005/0213848 | A1* | 9/2005 | Fan | G06T 11/60 382/284 |
| 2006/0001679 | A1* | 1/2006 | Hamburg | G06T 11/60 345/620 |
| 2006/0028481 | A1* | 2/2006 | Zhang | G06T 11/001 345/582 |
| 2006/0087518 | A1* | 4/2006 | Ameline | G06T 11/40 345/611 |
| 2007/0002071 | A1* | 1/2007 | Hoppe | G06T 11/001 345/582 |
| 2007/0211939 | A1* | 9/2007 | Kaus | A61B 6/00 382/173 |
| 2007/0296736 | A1* | 12/2007 | Hunt | G06T 5/30 345/629 |
| 2008/0150955 | A1* | 6/2008 | Ndjiki-Nya | G06T 11/001 345/582 |
| 2009/0122076 | A1* | 5/2009 | Zhong | G06T 15/503 345/611 |
| 2009/0232417 | A1* | 9/2009 | McMahan | G06F 16/58 382/309 |
| 2010/0027865 | A1* | 2/2010 | Wels | G06K 9/4614 382/131 |
| 2010/0245360 | A1* | 9/2010 | Song | A61B 5/02007 345/441 |
| 2011/0012910 | A1* | 1/2011 | Wei | G06T 11/001 345/582 |
| 2011/0234630 | A1* | 9/2011 | Batman | G06F 19/321 345/629 |
| 2012/0262485 | A1* | 10/2012 | Raghoebardajal | G06F 3/011 345/633 |
| 2013/0169827 | A1* | 7/2013 | Santos | H04N 5/23229 348/207.1 |
| 2013/0236083 | A1* | 9/2013 | Wang | G06T 7/174 382/144 |
| 2014/0205173 | A1* | 7/2014 | Padfield | G06K 9/00127 382/133 |
| 2014/0233820 | A1* | 8/2014 | Wu | A61B 6/505 382/131 |
| 2014/0327674 | A1* | 11/2014 | Sorkine-Hornung | G06T 7/50 345/426 |
| 2015/0023578 | A1* | 1/2015 | Li | G06T 7/0012 382/131 |
| 2016/0093079 | A1* | 3/2016 | Grams | G06T 11/001 345/589 |
| 2016/0148383 | A1* | 5/2016 | Cerqueira | G06F 16/50 382/194 |
| 2016/0275674 | A1* | 9/2016 | Rivet-Sabourin | G06T 7/11 |
| 2016/0342873 | A1* | 11/2016 | Feld | G06K 7/10722 |
| 2017/0140236 | A1* | 5/2017 | Price | G06K 9/4628 |
| 2017/0163882 | A1* | 6/2017 | Piramuthu | H04N 5/23222 |
| 2017/0262994 | A1* | 9/2017 | Kudriashov | G06K 9/00281 |
| 2018/0089833 | A1* | 3/2018 | Lewis | G06F 16/532 |
| 2018/0295400 | A1* | 10/2018 | Thomas | H04N 21/85406 |

OTHER PUBLICATIONS

"U.S. Appl. No. 15/850,989, Response filed Feb. 15, 2019 to Non Final Office Action dated Nov. 19, 2018", 14 pgs.

"U.S. Appl. No. 15/850,989, Notice of Allowance dated May 22, 2019", 7 pgs.

Efros, Alexei A, "Image quilting for texture synthesis and transfer", Proceedings of the 28th Annual ACM Conference on Computer Graphics and Interactive Techniques, (2001), 6 pgs.

Gao, Kaijan, "CS129 Project 4 Texture synthesis and transfer with Image Quilting", Brown University, [Online] Retrieved from the Internet: <URL: http://cs.brown.edu/courses/cs129/results/proj4/kgao/>, (accessed on Nov. 8, 2017), 6 pgs.

Gomez, Steve, "Project 2 Image Blending: Writeup", Brown University, [Online] Retrieved from the Internet: <URL: https://cs.brown.edu/courses/csci1950-g/results/proj2/steveg/>, (Feb. 13, 2010), 5 pgs.

Santoni, Christian, "gTangle: a Grammar for the Prodecural Generation of Tangle Patterns", ACM Transactions on Graphics (TOG), 35(6); Proceedings of SIGGRAPH Asia, Macao, (2016), 11 pgs.

* cited by examiner

ANNOTATING AN IMAGE WITH A TEXTURE FILL

CROSS-REFERENCE TO RELATED APPLICATION

This application is a continuation of and claims the priority of U.S. patent application Ser. No. 15/850,989, filed on Dec. 21, 2017, which claims priority to and the benefit of U.S. Provisional Patent Application No. 62/517,510, filed on Jun. 9, 2017, which are incorporated herein by reference in their entirety.

TECHNICAL FIELD

Embodiments described herein relate to media overlays and, more particularly, but not by way of limitation, to systems, methods, devices, and instructions for annotating a digital image with a texture fill.

BACKGROUND

Conventional software applications permit users to capture and alter digital images through an electronic device, such as a smartphone. For example, some software applications provide users with a set of features that they can use to alter a captured image by adjusting colors, applying filters, overlaying additional visual content on the captured image, and the like. Unfortunately, conventional digital image systems typically only provide fixed visual content (e.g., visual content of fixed size and shape) that can be overlaid on a digital image. As a result, some visual content may not fit well with respect to a particular digital image. Further, visual content overlays may be large in data size and, therefore, resource- (e.g., computer, data storage, and data communication) intensive to maintain or provide to a user computing device, such as a smartphone.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

DETAILED DESCRIPTION

Various embodiments provide systems, methods, devices, and instructions for annotating a digital image (hereafter, also referred to as an image), such as one captured by a mobile computing device, with a texture fill. According to some embodiments, an annotation system receives a user input defining a border separating a first portion of a target digital image from a second portion of the target digital image. The annotation system may then generate a contour mask, such as a binary mask, for the target digital image based on the user-defined border. The annotation system may then apply a media overlay to the target image based on the contour mask. In particular, the contour mask can define portions of the target digital image such that the annotation system will apply a media overlay to at least one of those portions while not applying the media overlay to remaining portions of the target digital image.

Various embodiments described herein can dynamically size or shape visual content prior to overlaying the visual content on a digital image. In this way, some embodiments can cause visual content to fit well with respect to a particular digital image. Additionally, some embodiments can handle visual content overlays that are large in data size such that the overlay process is less resource- (e.g., compute, data storage, or data communication) intensive than before. In this way, some embodiments permit a visual content overlay process to better operate on a user computing device, such as a smartphone.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
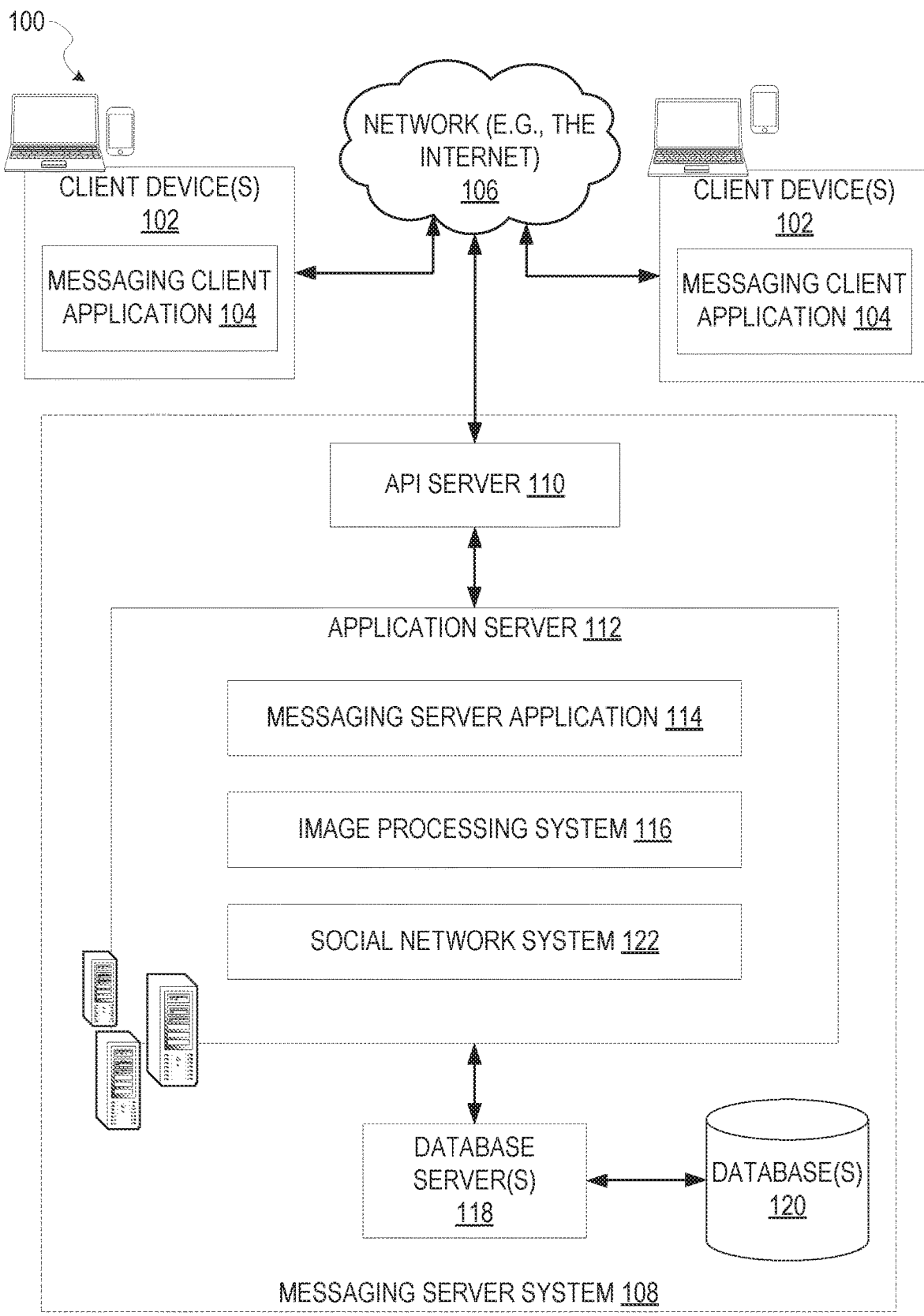
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., digital images or video) from a messaging client application 104 to the messaging server application 114, and for possible access by another messaging client application 104; the setting of a collection of media data (e.g., story), the retrieval of a list of friends of a user of a client device 102; the retrieval of such collections; the retrieval of messages and content, the adding and deletion of friends to a social graph; the location of friends within a social graph; and opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to digital images or video received within the payload of a message at the messaging server application 114.

The social network system 122 supports various social networking functions and services, and makes these functions and services available to the messaging server application 114. To this end, the social network system 122 maintains and accesses an entity graph 304 (FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
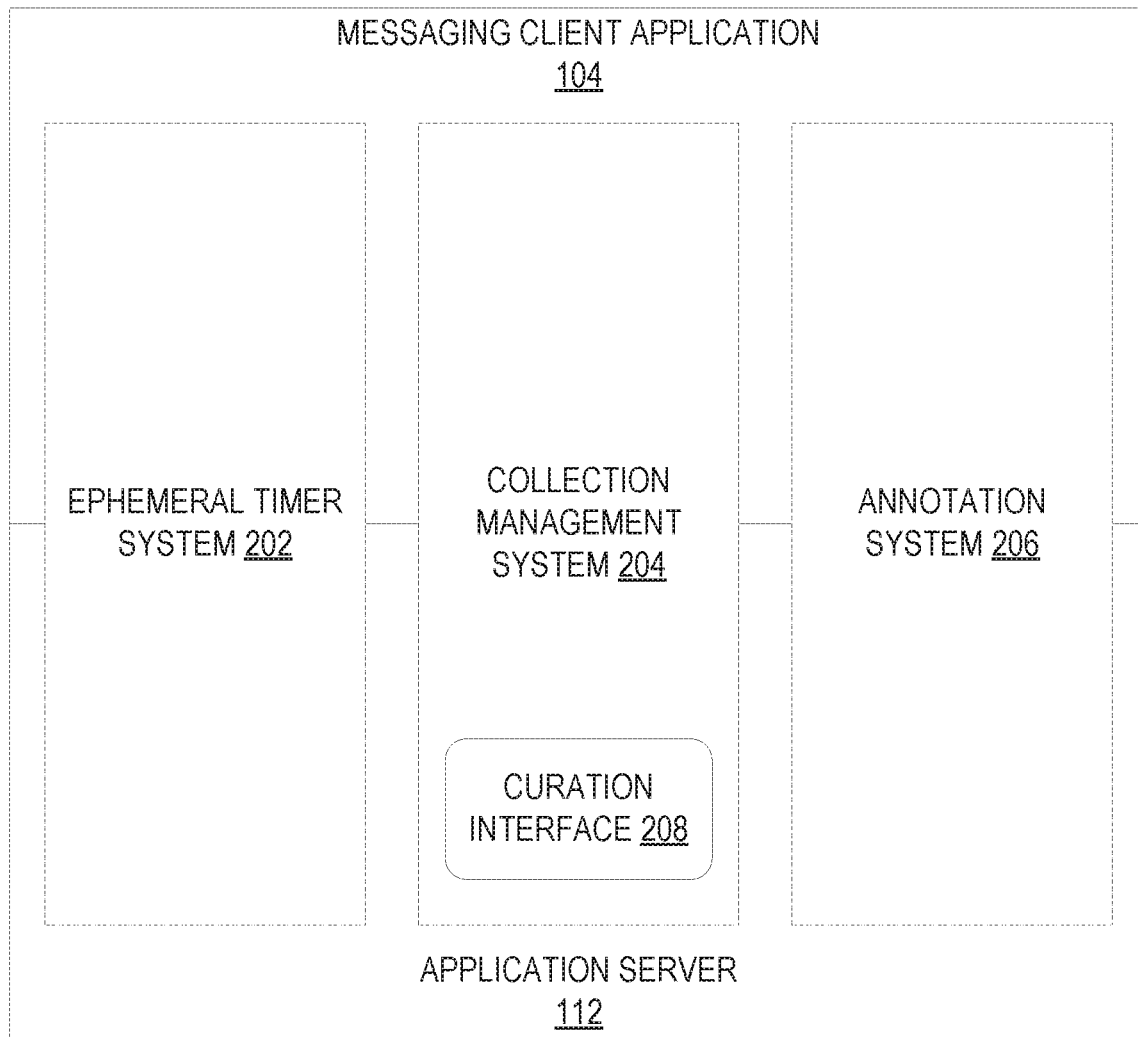
FIG. 2 is block diagram illustrating further details regarding a messaging system, according to some embodiments.

FIG. 2 is block diagram illustrating further details regarding the messaging system 100, according to some embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including digital images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay, such as a filter, a digital sticker, or a texture fill, to the messaging client application 104, which a user can then use to annotate the digital image.

A media overlay may include, without limitation, audio content, visual content, audio effects, and visual effects. Audio and visual content may include, for instance, images (e.g., pictures), text, logos, animations, texture fills and sound effects. A visual effect may include, for instance, color overlaying or texture filling. The media overlay can be applied to a media content item (e.g., a photo, image, video, etc.) at the client device 102. For example, a media overlay may include text that can be overlaid over an image (e.g., photo) captured by the client device 102. In another example, a media overlay may include a location overlay comprising text (e.g., stylized text) identifying a place (e.g., Venice beach), a geographic location (e.g., latitude and longitude), a name of a live event (e.g., a concert). In another example, a media overlay may include a name of a merchant (e.g., a merchant overlay, such as one for Beach Coffee House). In some embodiments, the annotation system 206 uses the geolocation of the client device 102 to identify a media overlay, such as a merchant overlay that is associated with and names a merchant at the geolocation of the client device 102. The media overlay may include another indicium associated with the merchant. The media overlays may be stored in the database 120 and accessed through the database server 118.

As used herein, a target digital image may refer to a digital image to which a texture fill is applied. A texture fill may comprise a type of media overlay that overlays a selected (visual) texture over a digital image. A texture fill may be based on a sample digital image that is repeated (e.g., in an arrangement) over an entire portion of a target digital image, or over a certain (e.g., user-selected) portion of the target digital image. An example of a texture fill may comprise a pattern, such as polka dot pattern that includes a sample digital image of a single dot or of an arrangement of two or more dots, where the sample digital image can be repeated over a target digital image in a predetermined arrangement to create the polka dot pattern. Any type of sample digital image may be used to create a texture fill, such as a sample digital image comprising one or more roses, grass, one or more flowers, and the like. The sample digital image may be repeated in an arrangement to create the texture fill. A sample digital image may comprise a semi-transparent digital image that may be overlaid on the target digital image such that some portion of the underlying target digital image shows through the sample digital image.

A texture fill may also include a full digital image that is not created based on a sample digital image. For example, the texture fill could be a larger singular digital image or a non-repetitive pattern that is overlaid over the target digital image whole.

The annotation system 206 enables a user to select application of a texture fill over a target digital image or, alternatively, a selected portion of the target digital image. For example, the annotation system 206 may enable a user to provide a user input defining a border with respect to the target digital image (e.g., on the target digital image), where the border defines a portion of the target digital image that will receive the texture fill and at least another portion of the image that will not receive the texture fill. As an example, the annotation system 206 may enable a user to use a touch screen, mouse, or other human input device to draw the border on the target digital image, which results in at least two portions being defined, and to select at least one of the at least two portions to receive the texture fill. Additionally, the annotation system 206 may enable a user to use a touch screen, mouse, or other human input device to select a texture fill. Accordingly, the user may draw a border, such as a circle, square, or the like, on a target digital image, thereby resulting in a portion of the target digital image within the border (e.g., inside the circle, square, etc.) or a portion of the target digital image outside of the border. The user may then select whether the portion within the border or the portion outside of the border will receive the texture fill.

The annotation system 206 may use the user-defined border to generate a contour mask for the target digital image, such as a binary mask. According to various embodiments, the contour mask defines portions of the target digital image, where one or more of those defined portions will be annotated by the annotation system 206 during an annotation process (e.g., application of a texture fill) while leaving remaining portions of the target digital image unchanged by the same annotation process.

For instance, for some embodiments, the annotation system 206 uses a binary mask generated based on a user-defined border to apply a texture fill (e.g., selected by a user from a plurality of texture fills) to a portion of the target digital image selected by a user (e.g., a portion automatically selected based on the user-defined border). A binary mask may comprise a matrix of binary values (e.g., 0 or 1) that correspond to the pixels in an image. For example, an image with five pixels across and five pixels long would result in a binary mask consisting of a five-by-five matrix of binary values. Each of the binary values may correspond to a unique one of the pixels in the target digital image. The annotation system 206 may set each binary value in the binary mask based on whether the binary value's corresponding pixel in the target digital image is within or outside the border provided by the user. For example, the annotation system 206 sets each binary value corresponding to a pixel within the border to 0 and each binary value corresponding to a pixel outside of the border to 1. Alternatively, the annotation system 206 sets each binary value corresponding to a pixel within the border to 1 and each binary value corresponding to a pixel outside of the border to 0. Though various embodiments are described herein with respect to a binary mask, for some embodiments the contour mask comprises something other than a binary mask.

The annotation system 206 may apply the texture fill to the target digital image based on the binary mask. For example, the annotation system 206 may apply the texture fill to each bit in the target digital image that corresponds to a binary value in the binary mask that is set to 1. Additionally, the annotation system 206 may apply the texture fill to each bit in the target digital image that corresponds to a binary value in the binary mask that is set to 0. As a result, for some embodiments, the texture fill is applied to the portions of the target digital image selected by the user and is not applied to the other portions of the target digital image according to the binary mask generated based on the user-defined border.

The annotation system 206 may use one of multiple techniques to apply a texture fill to a target digital image. One technique used by the annotation system 206 may comprise using a texture synthesis/texture transfer approach. For example, the annotation system 206 may use a sample digital image and apply the texture synthesis/texture transfer technique to generate the texture fill and annotate the target digital image. This technique may provide the benefit of using a small digital image (e.g., a sample digital image that is smaller in pixel size than the target digital image) to provide a texture fill of a target digital image as well as allowing for more complicated patterns. The complexity of applying such a technique may vary based on the sample digital image. For instance, simple sample digital images that easily form blended patterns (e.g., polka dots, stripes, etc.) may be easier to synthesize into a texture fill than more complicated sample digital images.

The texture synthesis/texture transfer process may be based on a known process (See, e.g., Efros. Alexei A., and Freeman, William T. (2001). Image quilting for texture synthesis and transfer, *ACM* 2001 (Proceedings of the 28th annual conference on computer graphics and interactive techniques)). For example, the texture synthesis/texture transfer process may first resize a texture pattern T, which comprises one or more sample digital images associated with a texture fill, to be the same pixel size as an input image I, which represents a target digital image that is to be annotated by the texture synthesis/texture transfer process. Next, the texture synthesis/texture transfer process may minimize the following cost function to compute a desired output digital image O, which represents the target digital image after the text pattern T is applied to the entire target digital image.

$$\|O-I\|^2 + \Lambda \|\Delta O - \Delta T\|.$$

After computing the desired output digital image O, the texture synthesis/texture transfer process may use a user-defined contour mask (e.g., binary mask generated based on a border drawn around an object by a user) to blend the desired output digital image O with the input digital image I and to generate a final digital image. The desired output digital image O may be blended with the input digital image I using the user-defined contour mask by performing fast Laplacian blending. The Laplacian blending process may be based on a known process (See. e.g., Gomez. Steve (2010). Project 2: Image Blending: Writeup. Retrieved from https://cs.brown.edu/courses/csci1950-g/results/proj2/steveg/). The final digital image may be such that the portion of content from the input digital image I that falls within the user-defined contour mask is maintained as originally depicted in the input digital image I, and the portion of content from the input digital image I that falls outside the user-defined contour mask is replaced by corresponding content from the desired output digital image O. The final digital image may represent an annotated digital image based on the target digital image, the user-defined contour mask, and the texture fill comprising the sample digital image.

Another technique used by the annotation system 206 may comprise using a full texture fill. The full texture fill may comprise a single instance of a sample digital image constituting the entire texture fill for a target digital image, thereby obviating the need to perform texture synthesis. The annotation system 206 may directly blend the texture fill with the digital image using, for example, Laplacian blending and the binary mask. In this way, a full texture fill can be used on a target digital image to add the single instance of the sample digital image to the target digital image as a background image, where the background image is blended with the target digital image. Though pixel size of the full texture fill may or may not be much larger than that of target digital image, using the full texture fill may allow for easy application of any pattern or image (via a single instance of the digital sample image), regardless of the complexity of the pattern or image.

A third technique used by the annotation system 206 may comprise duplicating at least a portion of the sample digital image to create the texture fill. For example, the annotation system 206 may generate a pattern based on a sample digital image by sampling at a least a portion of the sample digital image and then repeatedly arranging (e.g., placing) copies of the sampled portion relative to each other (e.g., next to each other) to form the pattern. In this way, the third technique can populate the pattern using the sample digital image. To create the texture fill, such a technique may use a sample digital image that is smaller than a target digital image and that may comprise a simple pattern. This third technique may be based on a known pattern generation process (See. e.g., Santoni, Christian, and Pellacini, Fabio (2016), gTangle: a Grammar for the Procedural Generation of Tangle Patterns. *ACM Transactions on Graphics* (Proceedings of SIGGRAPH Asia 2016)).

The media overlays may be stored in the database 120 and accessed through the database server 118.

In one embodiment, the annotation system 206 provides a user-based publication platform that enables a user to select a geolocation on a map and upload content associated with the selected geolocation. Through the annotation system 206, the user may also specify circumstances under which a particular media overlay (e.g., a user-created media overlay) should be offered to other users. For some embodiments, the annotation system 206 generates a media overlay that includes the uploaded content associated with a geolocation (e.g., user-selected geolocation), and associates the generated media overlay with the geolocation.

In another embodiment, the annotation system 206 provides a merchant-based publication platform that enables a merchant to select a particular media overlay (e.g., one created by the merchant or for the merchant) and to associate the particular media overlay selected with a geolocation, real-world feature, an image context, or the like, based on a bidding process. For example, the annotation system 206 may associate the media overlay of a highest-bidding merchant with a corresponding geolocation, real-world feature, determined image context, or the like. This association may be for a predefined amount of time.

Figure 3:
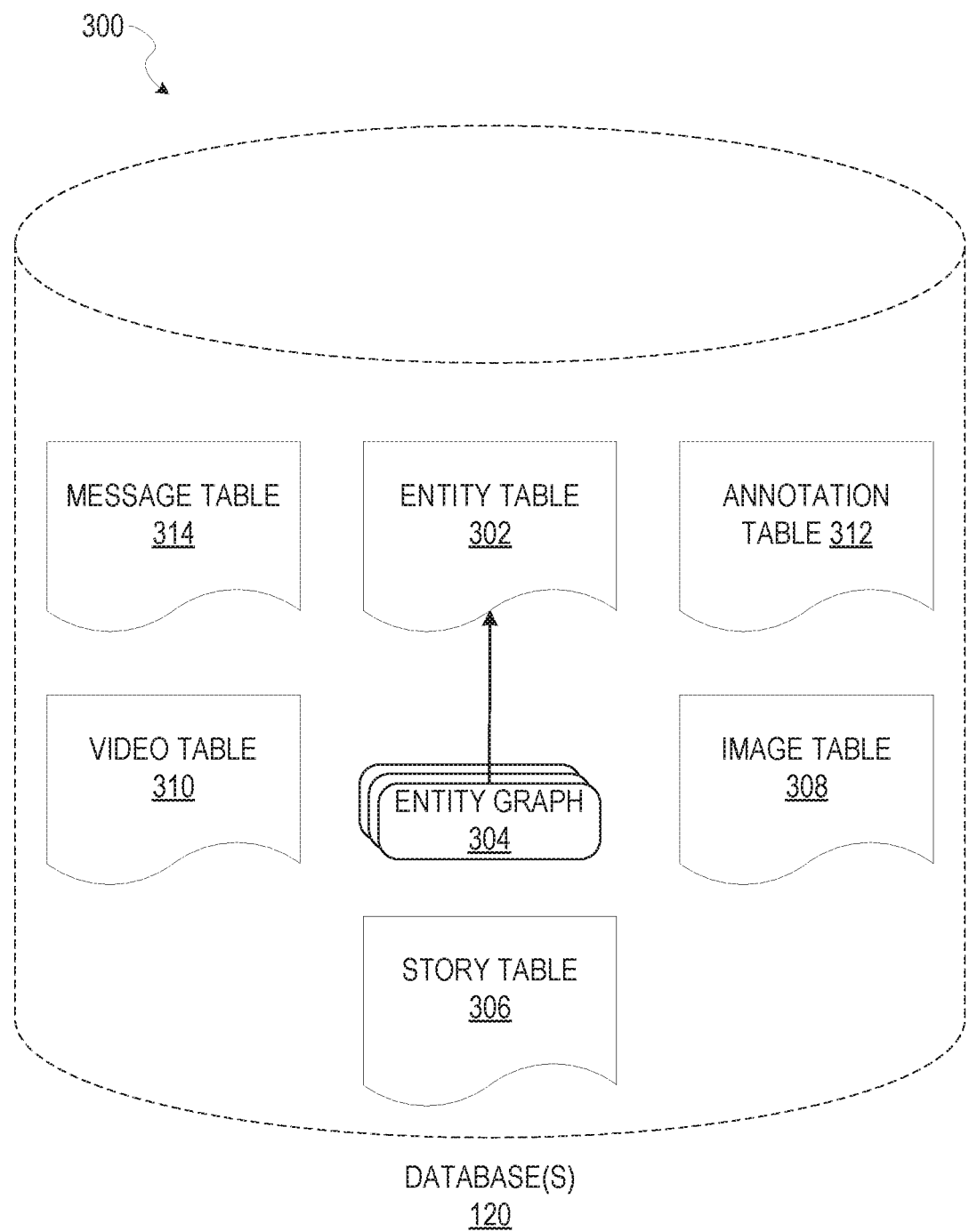
FIG. 3 is a schematic diagram illustrating data which may be stored in the database of the messaging system, according to some embodiments.

FIG. 3 is a schematic diagram illustrating data 300 which may be stored in the database 120 of the messaging server system 108, according to certain embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interest-based or activity-based, merely for example.

The database 120 also stores annotation data, such as filters, media overlays, texture fills and sample digital images in an annotation table 312. Filters, media overlays, texture fills, and sample digital images for which data is stored within the annotation table 312 are associated with and applied to videos (for which data is stored in a video table 310) or digital images (for which data is stored in an image table 308). In one example, an image overlay can be displayed as overlaid on a digital image or video during presentation to a recipient user. For example, a user may append a media overlay on a selected portion of the digital image, resulting in presentation of an annotated digital image that includes the media overlay over the selected portion of the digital image. In this way, a media overlay can be used, for example, as a digital sticker or a texture fill that a user can use to annotate or otherwise enhance a digital image, which may be capture by a user (e.g., photograph).

Each stored media overlay can be associated with metadata describing the media overlay. For example, the media overlay can be associated with metadata describing a physical item, action, or activity depicted by the media overlay, such as a guitar, shoes, running, or the like. The metadata can also include categorization data describing one or more categories associated with the media overlay. For example, a media overlay depicting a digital image of a guitar can be associated with categories, such as music, rock and roll music, or musical instruments. In some embodiments, the categorization data can include various levels of categories associated with a media overlay. For example, the categorization data can identify a general categorization for a media overlay that describes the media overlay at a high level, as well as one or more specific categorization levels that describe the media overlay with greater specificity. For example, a media overlay depicting a guitar can be assigned a general categorization of music and more specific categorizations, such as musical instrument, guitar, or electric guitars. The categorization data can also include a contextual categorization of a media overlay that describes a context that the media overlay is associated with. For example, a contextual categorization such as sunny day can include media overlays depicting digital images, such as beach balls, hot dogs, or baseball.

Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
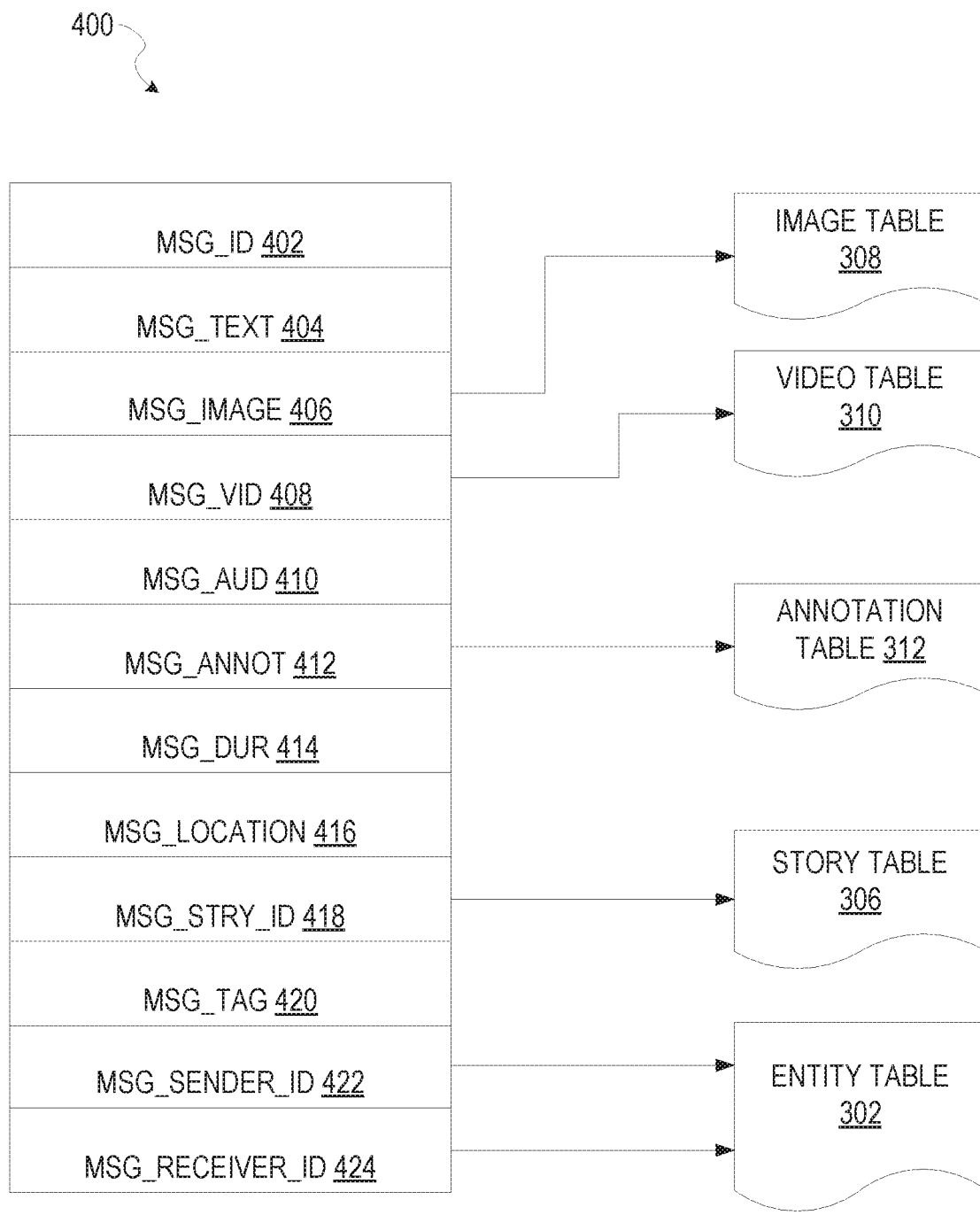
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "inflight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotation 412: annotation data (e.g., filters, stickers, texture fills, or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
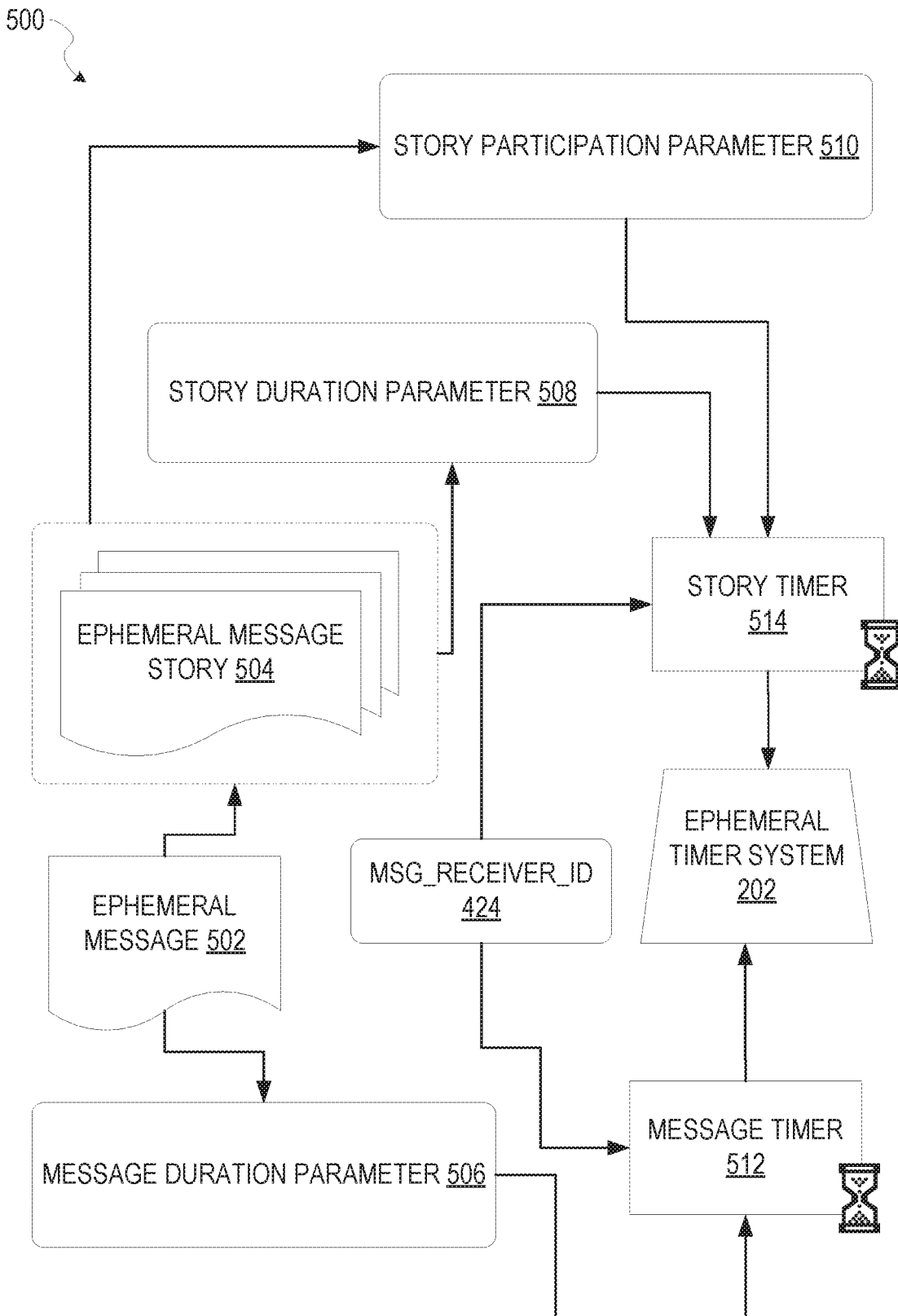
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
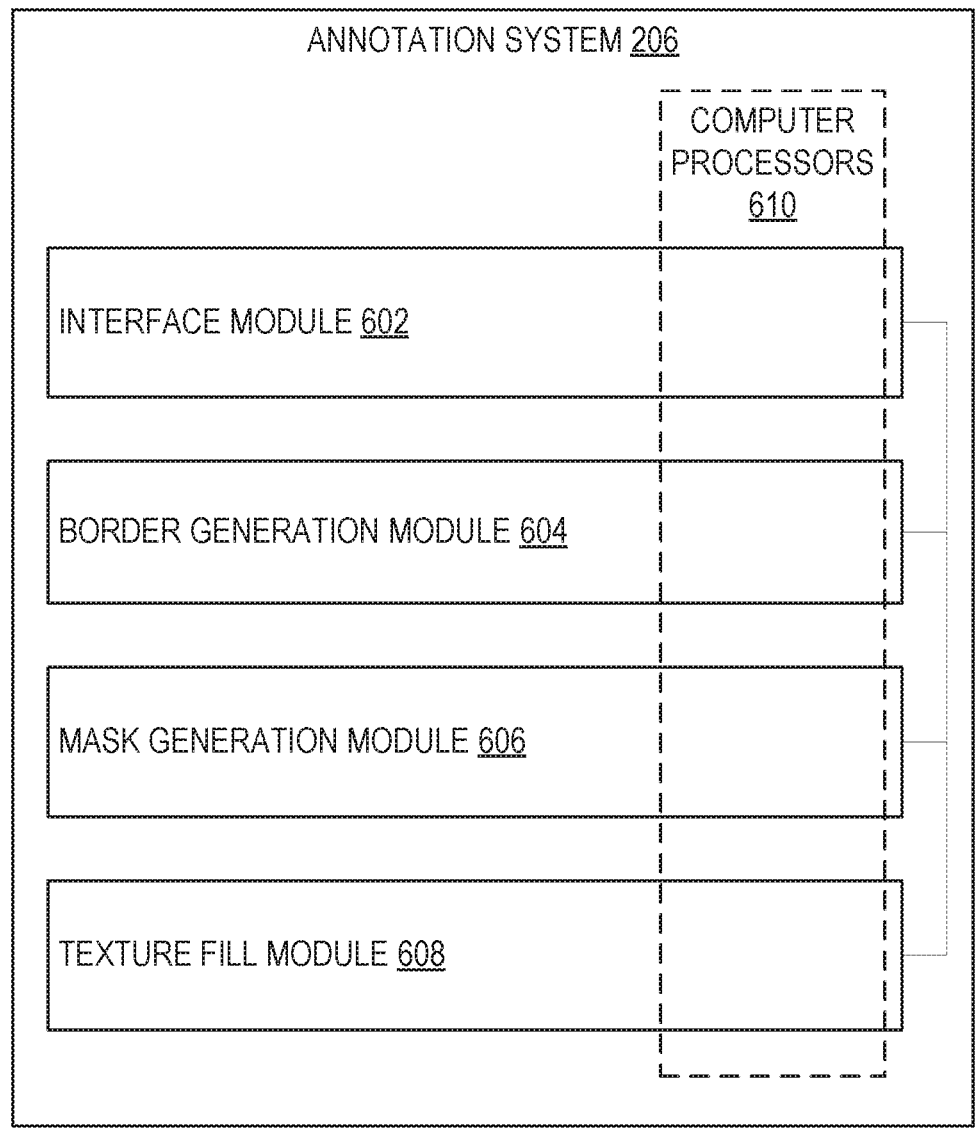
FIG. 6 is a block diagram illustrating an example annotation system for annotating a digital image with a texture fill, according to some embodiments.

FIG. 6 is a block diagram illustrating various modules of an annotation system 206, according to some embodiments. The annotation system 206 is shown as including an interface module 602, a border generation module 604, a mask generation module 606, and a texture fill module 608. The various modules of the annotation system 206 are configured to communicate with each other (e.g., via a bus, shared memory, or a switch). Any one or more of these modules may be implemented using one or more computer processors 610 (e.g., by configuring such one or more computer processors 610 to perform functions described for that module) and hence may include one or more of the computer processors 610.

Any one or more of the modules described may be implemented using hardware alone (e.g., one or more of the computer processors 610 of a machine (e.g., machine 1100)) or a combination of hardware and software. For example, any described module of the annotation system 206 may physically include an arrangement of one or more of the computer processors 610 (e.g., a subset of or among the one or more computer processors of the machine (e.g., machine 1100)) configured to perform the operations described herein for that module. As another example, any module of the annotation system 206 may include software, hardware, or both, that configure an arrangement of one or more computer processors 610 (e.g., among the one or more computer processors of the machine (e.g., machine 1100)) to perform the operations described herein for that module. Accordingly, different modules of the annotation system 206 may include and configure different arrangements of such computer processors 610 or a single arrangement of such computer processors 610 at different points in time. Moreover, any two or more modules of the annotation system 206 may be combined into a single module, and the functions described herein for a single module may be subdivided among multiple modules. Furthermore, according to various embodiments, modules described herein as being implemented within a single machine, database, or device may be distributed across multiple machines, databases, or devices.

The interface module 602 provides a user interface that enables a user to annotate a target digital image with a texture fill. The user interface may include user interface elements, such as buttons, scroll bars, and the like, that enable the user to select an existing digital image or capture a new digital image, as well as select from a set of available texture fills to annotate the target digital image. Accordingly, the user may use the user interface to select a target digital image (e.g., from a library of digital images) and a desired texture fill to annotate the target digital image. The annotation system 206 may enable the user to apply the texture full over the entire image or, alternatively, a selected portion of the target digital image.

The interface module 602 may further enable a user to provide a user input defining a border on the target digital image that defines a portion of the target digital image to receive the texture fill and another portion of the target digital image that will not receive the texture fill. As an example, the border generation module 604 enables a user to use a touch screen, mouse, or other input device to draw the border on the target digital image, as well as select which resulting portions of the target digital image are to receive the texture fill. Accordingly, the user may draw a border, such as a circle, square, etc., on the target digital image and select whether the portion of the target digital image within the border (e.g., inside the circle, square, etc.) or the portion outside of the border will received the texture fill.

The interface module 602 generates a set of coordinates or pixels of the target digital image traversed by the user input and provides the coordinates or pixels to the border generation module 604. The border generation module 604 generates a border based on the set of coordinates or pixels provided by the interface module 602. The border generation module 604 may apply smoothing or contouring techniques to the user-defined border, thereby removing jagged edges of the border, which can enhance the resulting annotation to the target digital image (e.g., using a contour mask generated based on the border).

The mask generation module 606 uses the border, generated by the border generation module 604, to generate a contour mask for the target digital image, such as a binary mask. A binary mask may comprise a matrix of binary values that correspond to pixels in a target digital image. For example, a target digital image with five pixels across and five pixels wide would result in a binary mask consisting of a five-by-five matrix of binary values in accordance with one embodiment. Each of the binary values may correspond to a unique one of the pixels in the target digital image. The mask generation module 606 may set each binary value in the binary mask based on whether the binary value's corresponding pixel in the target digital image is within or outside the border defined by the user via the interface module 602. For instance, the mask generation module 606 may set each binary value corresponding to a pixel within the border to 0 and each binary value corresponding to a pixel outside of the border to 1. Alternatively, the mask generation module 606 may set each binary value corresponding to a pixel within the border to 1 and each binary value corresponding to a pixel outside of the border to 0.

The texture fill module 608 applies the texture fill to the target digital image based on a contour mask (e.g., a binary mask) generated by the mask generation module 606. For example, the texture fill module 608 applies the texture fill to each pixel in the target digital image that corresponds to a binary value in the binary mask that is set to 1. Alternatively, the texture fill module 608 applies the texture fill to each pixel in the target digital image that corresponds to a binary value in the binary mask that is set to 0. As a result, the texture fill is applied to one or more portions of the target digital image selected by the user and is not applied to remaining portions of the target digital image.

The texture fill module 608 uses at least one technique (e.g., from multiple techniques) to apply a texture fill to a target digital image based on a contour mask. As described herein, one technique used by the annotation system 206 may comprise using a texture synthesis/texture transfer approach. For example, the texture fill module 608 may use a sample digital image and apply the texture synthesis/texture transfer technique to generate the texture fill and annotate the target digital image. This technique may provide the benefit of using a small digital image (e.g., a sample digital image that is smaller in pixel size than the target digital image) to provide a texture fill of a target digital image as well as allowing for more complicated patterns. The complexity of applying such a technique may vary based on the sample digital image. For instance, simple sample digital images that easily form blended patterns (e.g., polka dots, stripes, etc.) may be easier to synthesize into a texture fill than more complicated sample digital images.

As also described herein, the texture synthesis/texture transfer process may be based on a known process (See, e.g., Efros, *Alexei* A., and Freeman. William T. (2001). Image quilting for texture synthesis and transfer, *ACM* 2001 (Proceedings of the 28th annual conference on computer graphics and interactive techniques)). For example, the texture synthesis/texture transfer process may first resize a texture pattern T, which comprises one or more sample digital images associated with a texture fill, to be the same pixel size as an input image I, which represents a target digital image that is to be annotated by the texture synthesis/texture transfer process. Next, the texture synthesis/texture transfer process may minimize the following cost function to compute a desired output digital image O, which represents the target digital image after the text pattern T is applied to the entire target digital image.

$$\|O-I\|^2 + \Lambda\|\Delta O - \Delta T\|.$$

After computing the desired output digital image O, the texture synthesis/texture transfer process may use a user-defined contour mask (e.g., binary mask generated based on a border drawn around an object by a user) to blend the desired output digital image O with the input digital image I and to generate a final digital image. The desired output digital image O may be blended with the input digital image I using the user-defined contour mask by performing fast Laplacian blending. The Laplacian blending process may be based on a known process (See. e.g., Gomez, Steve (2010). Project 2: Image Blending: Writeup. Retrieved from https://cs.brown.edu/courses/csci1950-g/results/proj2/steveg/). The final digital image may be such that the portion of content from the input digital image I that falls within the user-defined contour mask is maintained as originally depicted in the input digital image I, and the portion of content from the input digital image I that falls outside the user-defined contour mask is replaced by corresponding content from the desired output digital image O. The final digital image may represent an annotated digital image based on the target digital image, the user-defined contour mask, and the texture fill comprising the sample digital image.

Another technique used by the texture fill module 608 may comprise using a full texture fill. The full texture fill may comprise a single instance of a sample digital image constituting the entire texture fill for a target digital image, thereby obviating the need to perform texture synthesis. The texture fill module 608 may directly blend the texture fill with the digital image using, for example, Laplacian blending and the binary mask. In this way, a full texture fill can be used on a target digital image to add the single instance of the sample digital image to the target digital image as a background image, where the background image is blended with the target digital image. Though the pixel size of the full texture fill may or may not be much larger than that of target digital image, using the full texture fill may allow for easy application of any pattern or image (via a single instance of the digital sample image), regardless of the complexity of the pattern or image.

A third technique used by the texture fill module 608 may comprise duplicating at least a portion of the sample digital image to create the texture fill. For example, the texture fill module 608 may generate a pattern based on a sample digital image by sampling at least a portion of the sample digital image and then repeatedly arranging (e.g., placing) copies of the sampled portion relative to each other (e.g., next to each other) to form the pattern. In this way, the third technique can populate the pattern using the sample digital image. To create the texture fill, such a technique may use a sample digital image that is smaller than a target digital image and that may comprise a simple pattern. This third technique may be based on a known pattern generation process (See. e.g., Santoni. Christian. and Pellacini, Fabio (2016), gTangle: a Grammar for the Procedural Generation of Tangle Patterns, *ACM Transactions on Graphics* (Proceedings of SIGGRAPH Asia 2016)).

Figure 7:
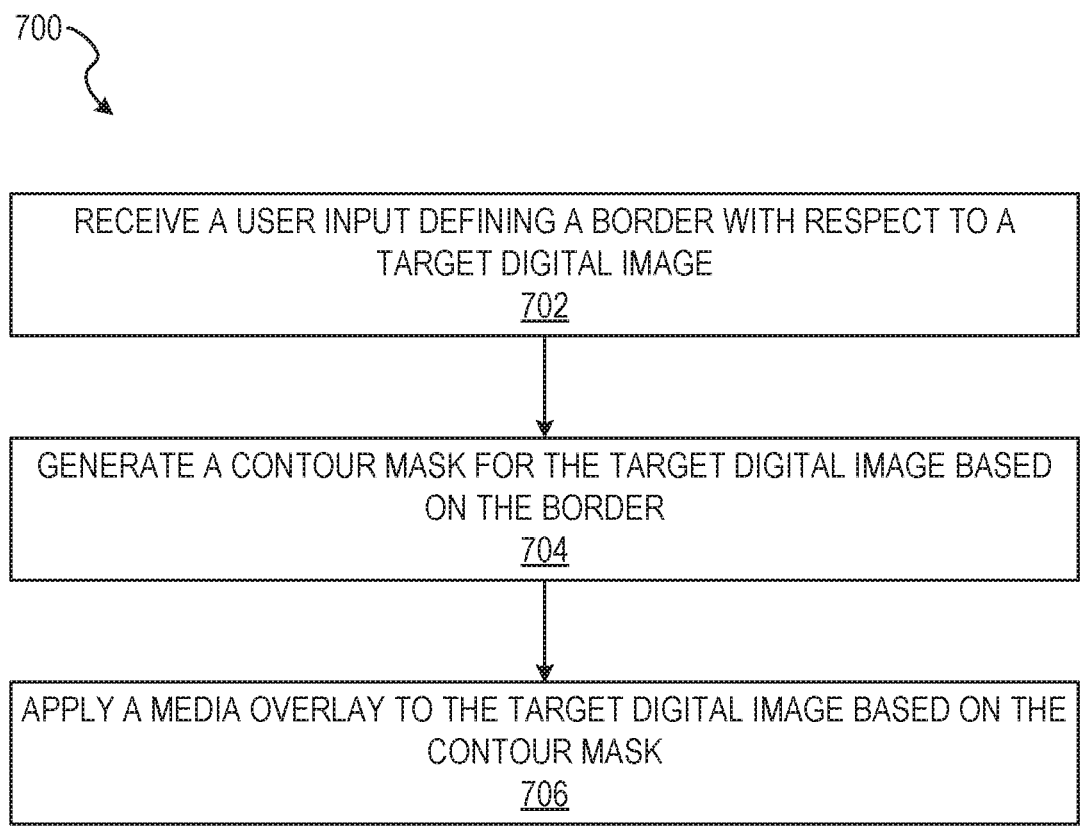
FIGS. 7 and 8 are flowcharts illustrating example methods for annotating a digital image with a texture fill, according to some embodiments.

FIG. 7 is a flowchart illustrating a method 700 for annotating an image with a texture full, according to certain embodiments. The method 700 may be embodied in computer-readable instructions for execution by one or more computer processors such that the operations of the method 700 may be performed in part or in whole by the messaging server system 108; accordingly, the method 700 is described below by way of example with reference thereto. At least some of the operations of the method 700 may be deployed on various other hardware configurations, and the method 700 is not intended to be limited to being operated by the messaging server system 108.

At operation 702, the interface module 602 receives a user input defining a border with respect to a target digital image. For example, a user may use a touchpad, mouse, or other input device to draw the border on a target digital image displayed on a client device. The target digital image may be, for example, one that is captured by a user (e.g., via the client device) or selected by the user (e.g., from a library of digital images). The border may separate a first portion of the target digital image that is within the border from a second portion of the target digital image that is outside of the border. The user may also select which portion of the target digital image (i.e., inside the border or outside of the border) the media overlay (e.g., texture fill) should be applied to. The border generation module 604 may apply a contouring technique to coordinate data received via the user input. The contoured coordinate data may represent the border.

At operation 704, the mask generation module 606 generates a contour mask, such as a binary mask, for the target digital image based on the border, which is defined by the user input received at operation 702. The binary mask may include a set of binary values corresponding to a set of pixels of the target digital image. Each binary value in the set of binary values may correspond to a unique one of the pixels in the set of pixels. A first subset of binary values from the set of binary values that correspond to pixels in the first portion of the target digital image may be assigned a first value by the mask generation module 606. A second subset of binary values from the set of binary values that correspond to pixels in the second portion of the target digital image may be assigned a second value that is different than the first value by the mask generation module 606. For instance, the first value may be 0 and the second value may be 1. Alternatively, the first value may be 1 and the second value may be 0.

At operation 706, the texture fill module 608 applies a media overlay to the target digital image based on the contour mask generated by operation 704. The texture fill module 608 may use one of several techniques to apply a media overlay based on the contour mask. Further, the texture fill module 608 may select a texturing technique to use based on a sample digital image for the media overlay. For some embodiments, the texture fill module 608 may select a technique best suited for the sample digital image. For instance, the texture fill module 608 of an embodiment may choose to use a full texture fill approach or a repeated-duplication approach described herein where the sample digital image is determined to contain simple content (e.g., a black and white or grayscale content). Using such techniques may save one or more computing resources on the machine (e.g., client device) performing the method 700, such as processing or memory resources. Alternatively, the texture fill module 608 of an embodiment may choose to use a texture synthesis/texture transfer approach where the sample digital image is determined to contain complex content.

In some embodiments, the texture fill module 608 applies the media overlay (e.g., texture fill) by accessing a sample digital image selected by the user. The sample digital image in this case may be smaller in pixel size than the target digital image. The texture fill module 608 may apply a texture synthesis technique based on the sample digital image and the target digital image, yielding the media overlay. The texture fill module 608 may then apply a texture transfer technique to the media overlay and the target digital image based on the contour mask, yielding an annotated digital image.

In some embodiments, the texture fill module 608 applies the media overlay by accessing a full digital image associated with the media overlay. The texture fill module 608 may then apply, based on the contour mask, the media overlay to the target digital image using a Laplacian blending, yielding an annotated digital image.

In some embodiments, the texture fill module 608 applies the media overlay by accessing a sample digital image selected by the user that is smaller than the target digital image. The texture fill module 608 may duplicate the sample digital image based on a pixel size of the target digital image, yielding the media overlay. The texture fill module 608 may then apply the media overlay to the target digital image based on the contour mask, yielding an annotated digital image.

Figure 8:
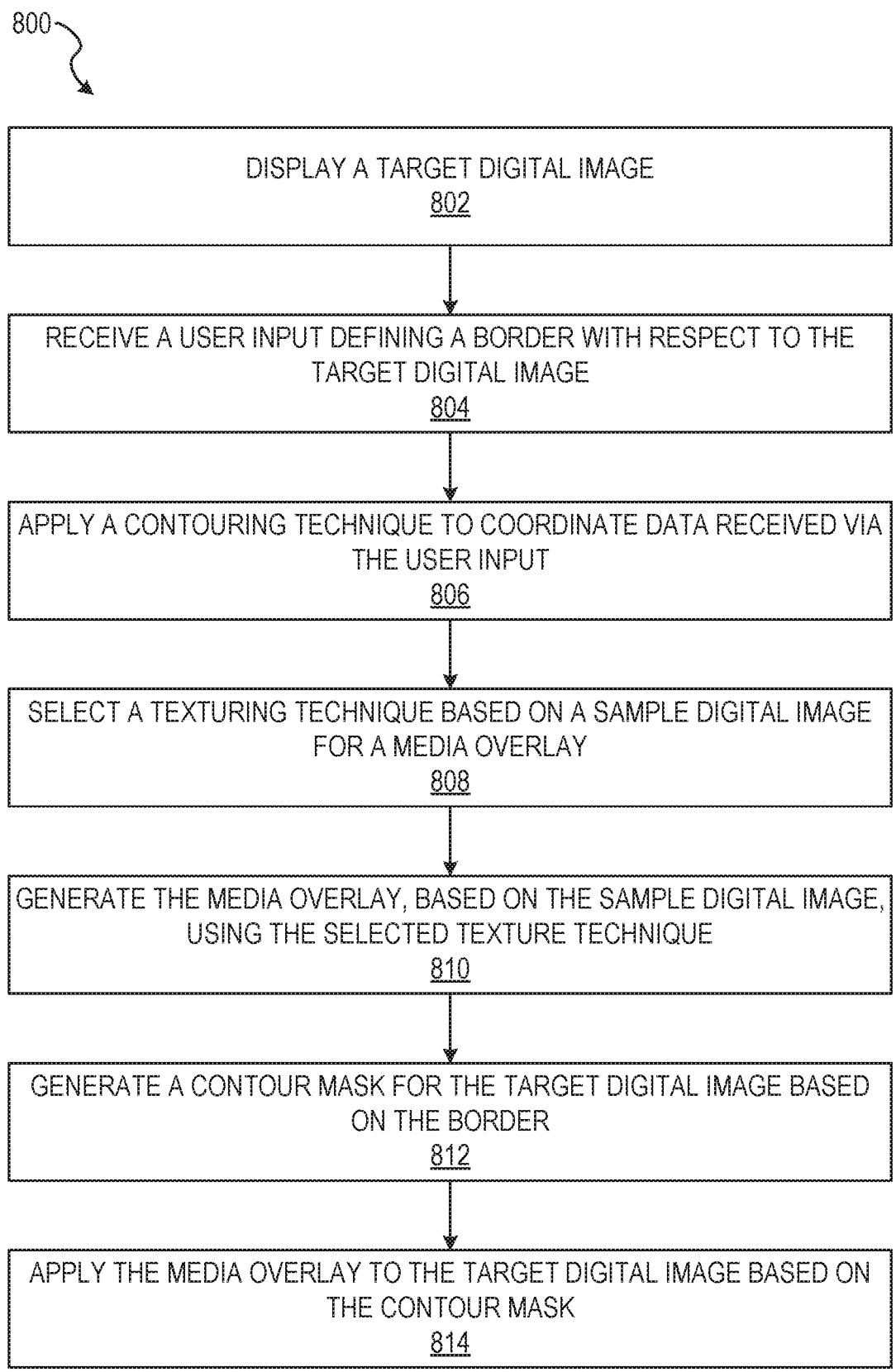

FIG. 8 is a flowchart illustrating a method 800 for annotating an image with a texture fill, according to certain embodiments. The method 800 may be embodied in computer-readable instructions for execution by one or more computer processors such that the operations of the method 800 may be performed in part or in whole by the messaging server system 108; accordingly, the method 800 is described below by way of example with reference thereto. At least some of the operations of the method 800 may be deployed on various other hardware configurations, and the method 800 is not intended to be limited to being operated by the messaging server system 108.

At operation 802, the interface module 602 causes a target digital image to be displayed on an electronic display (e.g., of a client device). The method 800 continues with operation 804, where the interface module 602 receives a user input defining a border. For some embodiments, operation 804 is similar to operation 702 of the method 700 described above with respect to FIG. 7. According to some embodiments, the interface module 602 generates coordinate data based on the user input received, where the coordinate data represents the border.

At operation 806, the border generation module 604 applies a contouring technique to coordinate data received via the user input, where the user input was received by the interface module 602 at operation 804. As described herein, applying the contouring to the coordinate data can remove jagged edges of the border and smoothen it, which in turn can enhance the resulting annotation of the target digital image (e.g., using a contour mask generated based on the border).

At operation 808, the texture fill module 608 selects a texturing technique to be used to apply a media overlay (e.g., texture fill) to the target digital image based on a sample digital image for the media overlay. As described herein, the texture fill module 608 may select the texturing technique best suited for the sample digital image. For instance, the texture fill module 608 may choose to use a full texture fill approach or a repeated-duplication approach described herein where the sample digital image is determined to contain simple content. Alternatively, the texture fill module 608 may choose to use a texture synthesis/texture transfer approach where the sample digital image is determined to contain complex content.

At operation 810, the texture fill module 608 generates the media overlay, based on the sample digital image, using the texture technique selected by the texture fill module 608 at operation 808. According to some embodiments, the media overlay generated by the texture fill module 608 comprises a texture fill to be applied to the target digital image.

At operation 812, the mask generation module 606 generates a contour mask, such as a binary mask, for the target digital image based on the border. With respect to the method 800, the mask generation module 606 generates the contour mask based on the border that results after the border generation module 604 applies the contouring technique to the border at operation 806. For some embodiments, operation 812 is similar to operation 704 of the method 700 described above with respect to FIG. 7.

At operation 814, the texture fill module 608 applies the media overlay, generated by operation 810, to the target digital image based on the contour mask generated by operation 812. For some embodiments, operation 814 is similar to operation 706 of the method 700 described above with respect to FIG. 7.

Figure 9:
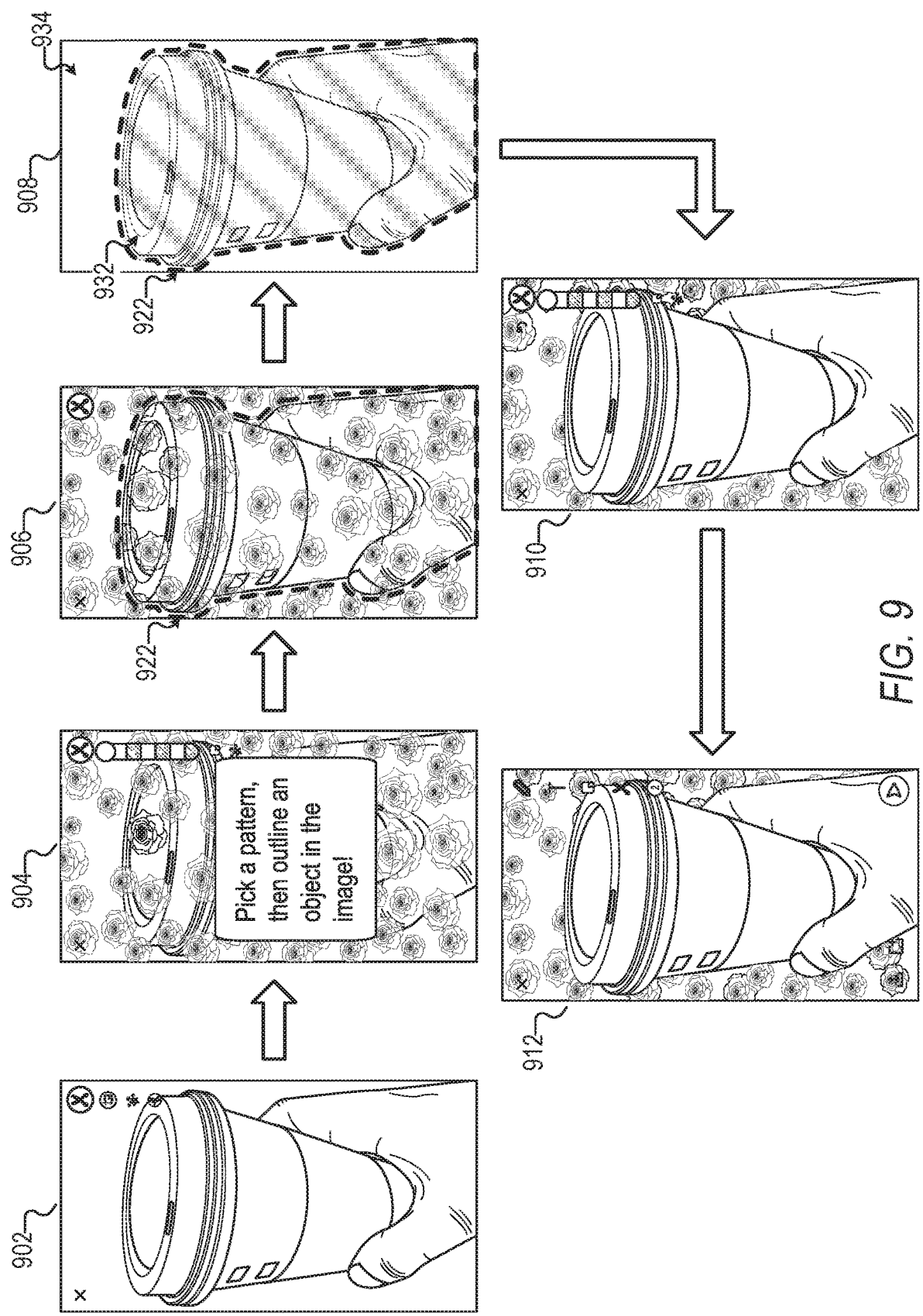
FIG. 9 provides screenshots of example graphical user interfaces for annotating a digital image with a texture fill, according to some embodiments.

FIG. 9 provides screenshots of example graphical user interfaces for annotating a digital image with a texture fill, according to certain embodiments. In particular, the first screenshot 902 shows a graphical user interface that is displaying a target digital image that may have been selected or captured by a user (e.g., via a user device) and that the user may wish to annotate with a texture fill in accordance with some embodiments. As shown, the target digital image comprises a coffee cup being held by an individual.

The second screenshot 904 shows a graphical user interface after a user has selected a texture fill (e.g., pattern), which causes the selected texture fill (comprising roses) to be displayed over the target digital image. In the second screenshot 904, the target digital image as displayed has yet to be been finalized by the annotation process. As shown in the second screenshot 904, the graphical user interface instructs the user to outline an object in the target digital image.

The third screenshot 906 shows a graphical user interface where the user drew a border 922 (e.g., outlined) around an object depicted in the target digital image, specifically the coffee cup and the user's hand. According to some embodiments, the border 922 defines a first portion of the target digital image that the texture fill will be applied to (i.e., the portion outside of the border 922, which does not include the cup and the user's hand), and a second portion of the target digital image that the texture fill will not be applied to (i.e., the portion inside the border 922, which includes the cup and the user's hand).

Diagram 908 is not a screenshot but better illustrates the border 922, the first portion 934 of the target digital image and the second portion 932 of the target digital image. As described herein, based on the border 922, some embodiments generate a contour mask (e.g., binary mask) that defines the first portion 934 and the second portion 932. Such embodiments may then use the contour mask to apply the texture fill selected by the user (e.g., in the second screenshot 904).

The fourth screenshot 910 shows a graphical user interface displaying a (finalized) annotated digital image after the texture fill has been applied to the target digital image based on the border 922 (i.e., the texture fill applied only to the first portion 934 of the image). The fifth screenshot 912 shows a graphical user interface that displays the annotated digital image after the graphical controls for the annotation process are hidden.

Figure 10:
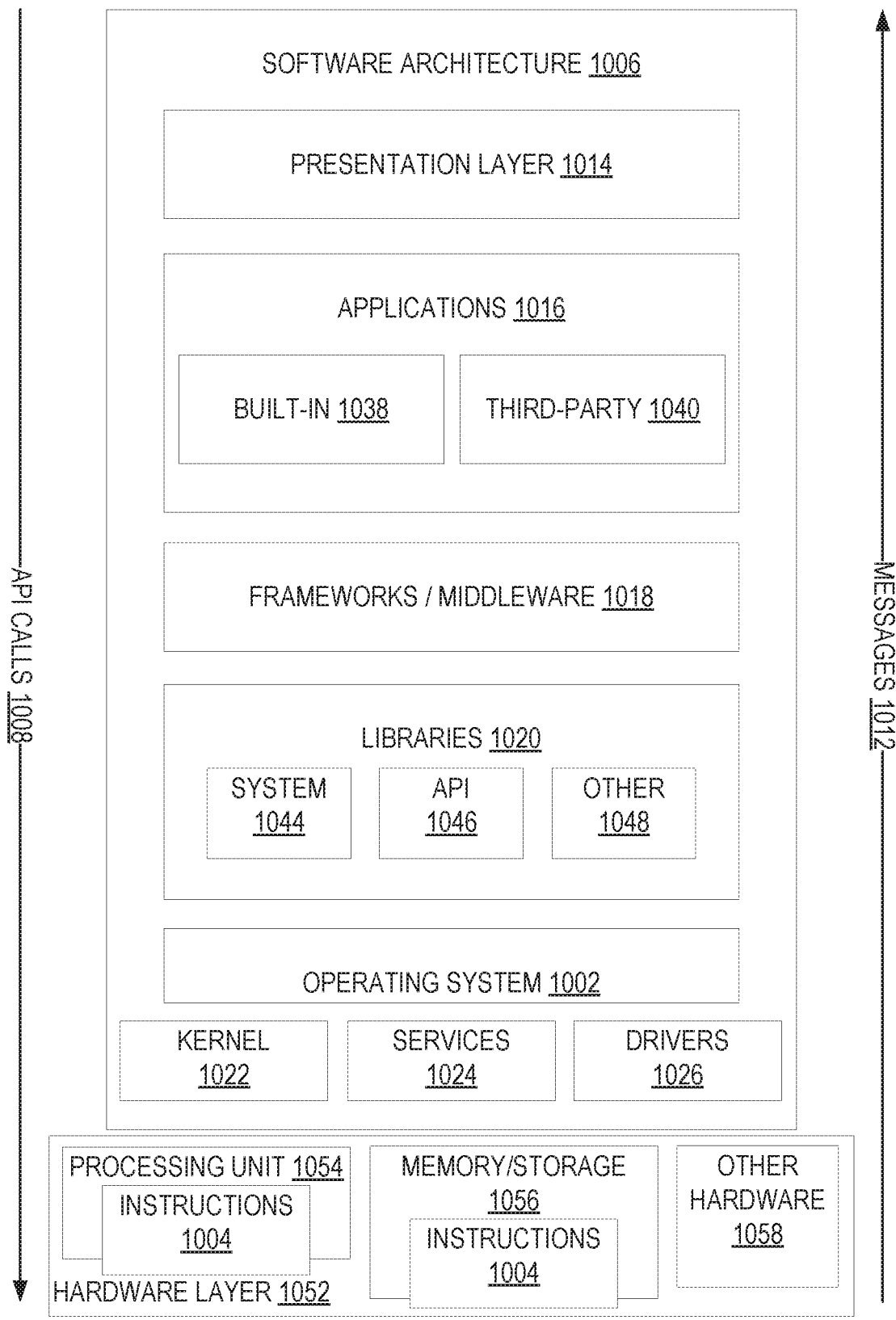
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016, and a presentation layer 1014. Operationally, the applications 1016 or other components within the layers may invoke application programming interface (API) calls 1008 through the software stack and receive a response in the example form of messages 1012 to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1020 provide a common infrastructure that is used by the applications 1016 or other components or layers. The libraries 1020 provide functionality that allows other software components to perform tasks in an easier fashion than to interface directly with the underlying operating system 1002 functionality (e.g., kernel 1022, services 1024, or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4. H.264, MP3, AAC, AMR, JPG. PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be used by the applications 1016 or other software components/modules, some of which may be specific to a particular operating system 1002 or platform.

The applications 1016 include built-in applications 1038 or third-party applications 1040. Examples of representative built-in applications 1038 may include, but are not limited to, a contacts application, a browser application, a book reader application, a location application, a media application, a messaging application, or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™. WINDOWS® Phone. or other mobile operating systems. The third-party applications 1040 may invoke the API calls 1008 provided by the mobile operating system (such as operating system 1002) to facilitate functionality described herein.

The applications 1016 may use built-in operating system functions (e.g., kernel 1022, services 1024, or drivers 1026), libraries 1020, and frameworks/middleware 1018 to create user interfaces to interact with users of the system. Alternatively. or additionally, in some systems interactions with a user may occur through a presentation layer, such as presentation layer 1014. In these systems, the application/component "logic" can be separated from the aspects of the application/component that interact with a user.

Figure 11:
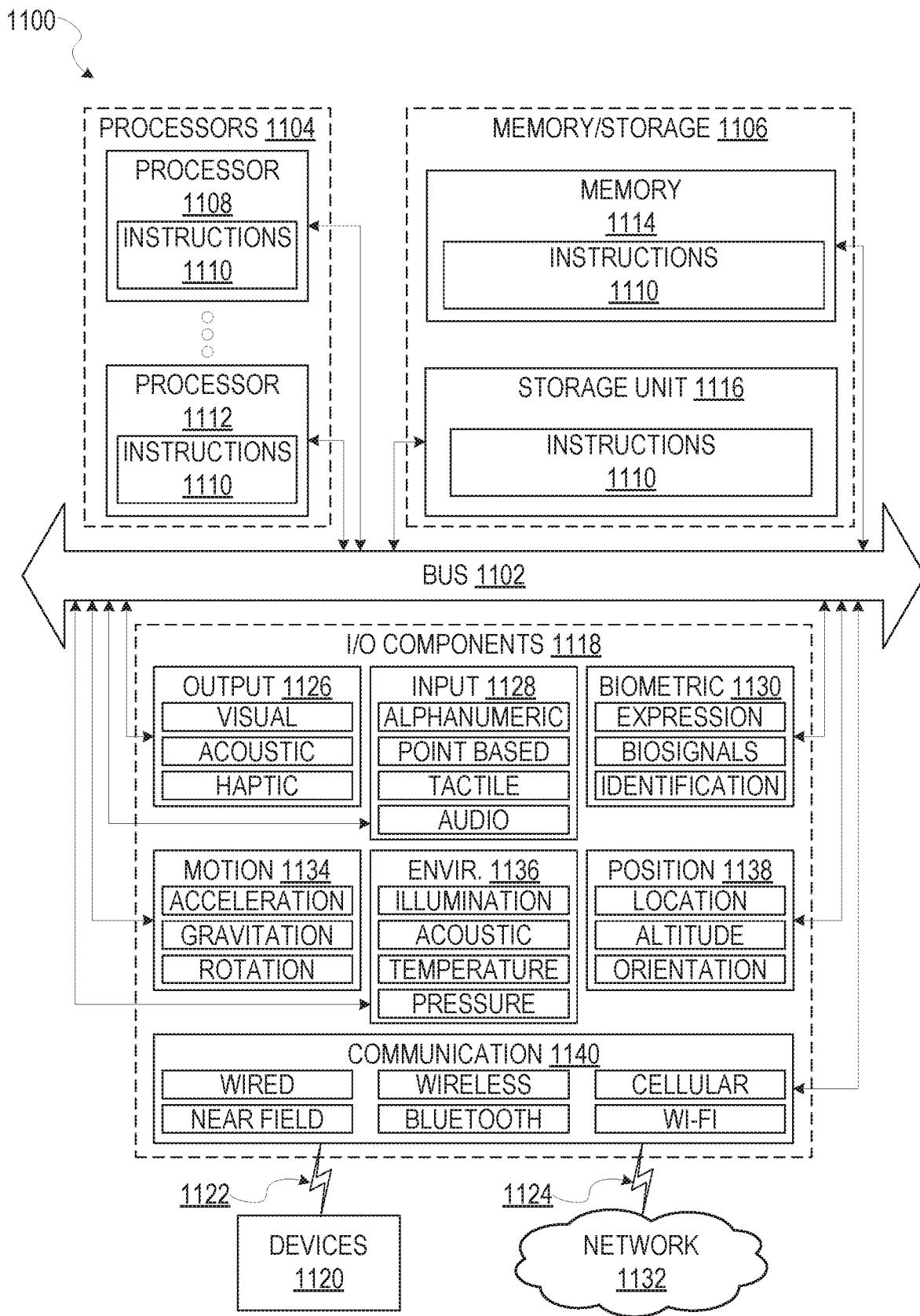
FIG. 11 is a block diagram illustrating components of a machine, according to some embodiments, able to read instructions from a machine-readable medium (e.g., a machine-readable storage medium) and perform any one or more of the methodologies discussed herein.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further embodiments, the I/O components 1118 may include biometric components 1130, motion components 1134, environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417. Ultra Code, UCC RSS-2D bar code, and other optical codes), or acoustic detection components (e.g., microphones to identify tagged audio signals).

In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

As used herein, "ephemeral message" can refer to a message that is accessible for a time-limited duration (e.g., maximum of 10 seconds). An ephemeral message may comprise a text content, image content, audio content, video content and the like. The access time for the ephemeral message may be set by the message sender or, alternatively, the access time may be a default setting or a setting specified by the recipient. Regardless of the setting technique. an ephemeral message is transitory. A message duration parameter associated with an ephemeral message may provide a value that determines the amount of time that the ephemeral message can be displayed or accessed by a receiving user of the ephemeral message. An ephemeral message may be accessed or displayed using a messaging client software application capable of receiving and displaying content of the ephemeral message, such as an ephemeral messaging application.

As also used herein, "ephemeral message story" can refer to a collection of ephemeral message content that is accessible for a time-limited duration, similar to an ephemeral message. An ephemeral message story may be sent from one user to another, and may be accessed or displayed using a messaging client software application capable of receiving and displaying the collection of ephemeral content, such as an ephemeral messaging application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor.

Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output.

Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
generating a contour mask for a target digital image based on a user-defined border with respect to the target digital image, the user-defined border separating a first portion of the target digital image from a second portion of the target digital image, the contour mask including a set of values corresponding to a set of pixels of the target digital image, a first subset of values from the set of values corresponding to pixels in the first portion of the target digital image, a second subset of values from the set of values corresponding to pixels in the second portion of the target digital image, the first subset of values being different from the second subset of values; and
applying a media overlay to the target digital image based on the contour mask, the media overlay being applied to each pixel of the target digital image corresponding to the second subset of values.

2. The method of claim 1, further comprising:
receiving from a user a user input defining the user-defined border with respect to the target digital image.

3. The method of claim 2, further comprising:
applying a contouring technique to coordinate data received via the user input, yielding the user-defined border separating the first portion of the target digital image from the second portion of the target digital image.

4. The method of claim 1, further comprising:
determining, based on a sample digital image for the media overlay, to use a first texturing technique from a plurality of texturing techniques; and
generating the media overlay using the first texturing technique.

5. The method of claim 1, wherein applying the media overlay comprises:
accessing a sample digital image selected by a user, the sample digital image being smaller than the target digital image;
applying a texture synthesis technique based on the sample digital image and the target digital image, yielding the media overlay; and
applying a texture transfer technique to the media overlay and the target digital image based on the contour mask, yielding an annotated digital image.

6. The method of claim 1, wherein applying the media overlay comprises:
accessing the media overlay, the media overlay being a full digital image; and
applying, based on the contour mask, the media overlay to the target digital image using a Laplacian blending, yielding an annotated digital image.

7. The method of claim 1, wherein applying the media overlay comprises:
accessing a sample digital image selected by a user, the sample digital image being smaller than the target digital image;
duplicating the sample digital image based on a size of the target digital image, yielding the media overlay; and
applying the media overlay to the target digital image based on the contour mask, yielding an annotated digital image.

8. An annotation system comprising:
one or more computer processors; and
one or more computer-readable mediums storing instructions that, when executed by the one or more computer processors, cause the annotation system to perform operations comprising:
generating a contour mask for a target digital image based on a user-defied border with respect to the target digital image, the user-defined border separating a first portion of the target digital image from a second portion of the target digital image, the contour mask including a set of values corresponding to a set of pixels of the target digital image, a first subset of values from the set of values corresponding to pixels in the first portion of the target digital image, a second subset of values from the set of values corresponding to pixels in the second portion of the target digital image, the first subset of values being different from the second subset of values; and
applying a media overlay to the target digital image based on the contour mask, the media overlay being applied to each pixel of the target digital image corresponding to the second subset of values.

9. The annotation system of claim 8, wherein the operations further comprise:
receiving from a user a user input defining the user-defined border with respect to the target digital image.

10. The annotation system of claim 9, wherein the operations further comprise:
applying a contouring technique to coordinate data received via the user input, yielding the user-defined border separating the first portion of the target digital image from the second portion of the target digital image.

11. The annotation system of claim 8, wherein the operations further comprise:
determining, based on a sample digital image for the media overlay, to use a first texturing technique from a plurality of texturing techniques; and
generating the media overlay using the first texturing technique.

12. The annotation system of claim 8, wherein applying the media overlay comprises:
accessing a sample digital image selected by a user, the sample digital image being smaller than the target digital image;
applying a texture synthesis technique based on the sample digital image and the target digital image, yielding the media overlay; and
applying a texture transfer technique to the media overlay and the target digital image based on the contour mask, yielding an annotated digital image.

13. The annotation system of claim 8, wherein applying the media overlay comprises:
accessing the media overlay, the media overlay being a full digital image; and
applying, based on the contour mask, the media overlay to the target digital image using a Laplacian blending, yielding an annotated digital image.

14. The annotation system of claim 8, wherein applying the media overlay comprises:
accessing a sample digital image selected by a user, the sample digital image being smaller than the target digital image;
duplicating the sample digital image based on a size of the target digital image, yielding the media overlay; and
applying the media overlay to the target digital image based on the contour mask, yielding an annotated digital image.

15. A non-transitory computer-readable medium storing instructions that, when executed by one or more computer processors, cause the one or more computer processors to perform operations comprising:
generating a contour mask for a target digital image based on a user-defined border with respect to the target digital image, the user-defined border separating a first portion of the target digital image from a second portion of the target digital image, the contour mask including a set of values corresponding to a set of pixels of the target digital image, a first subset of values from the set of values corresponding to pixels in the first portion of the target digital image, a second subset of values from the set of values corresponding to pixels in the second portion of the target digital image, the first subset of values being different from the second subset of values; and
applying a media overlay to the target digital image based on the contour mask, the media overlay being applied to each pixel of the target digital image correspond to the second subset of values.

16. The non-transitory computer-readable medium of claim 15, wherein the operations further comprise:
receiving from a user a user input defining the user-defined border with respect to the target digital image; and
applying a contouring technique to coordinate data received via the user input, yielding the user-defined border separating the first portion of the target digital image from the second portion of the target digital image.

17. The non-transitory computer-readable medium of claim 15, wherein the operations further comprise:
   determining, based on a sample digital image for the media overlay, to use a first texturing technique from a plurality of texturing techniques; and
   generating the media overlay using the first texturing technique.

18. The non-transitory computer-readable medium of claim 15, wherein applying the media overlay comprises:
   accessing a sample digital image selected by a user, the sample digital image being smaller than the target digital image;
   applying a texture synthesis technique based on the sample digital image and the target digital image, yielding the media overlay; and
   applying a texture transfer technique to the media overlay and the target digital image based on the contour mask, yielding an annotated digital image.

19. The non-transitory computer-readable medium of claim 15, wherein applying the media overlay comprises:
   accessing the media overlay, the media overlay being a full digital image; and
   applying, based on the contour mask, the media overlay to the target digital image using a Laplacian blending, yielding an annotated digital image.

20. The non-transitory computer-readable medium of claim 15, wherein applying the media overlay comprises:
   accessing a sample digital image selected by a user, the sample digital image being smaller than the target digital image;
   duplicating the sample digital image based on a size of the target digital image, yielding the media overlay; and
   applying the media overlay to the target digital image based on the contour mask, yielding an annotated digital image.

\* \* \* \* \*

UNITED STATES PATENT AND TRADEMARK OFFICE
CERTIFICATE OF CORRECTION

PATENT NO. : 10,672,168 B1  
APPLICATION NO. : 16/529475  
DATED : June 2, 2020  
INVENTOR(S) : Hu et al.

Page 1 of 1

It is certified that error appears in the above-identified patent and that said Letters Patent is hereby corrected as shown below:

In the Claims

In Column 27, Line 44, in Claim 8, delete "user-defied" and insert --user-defined-- therefor In Column 28, Line 59, in Claim 15, delete "correspond" and insert --corresponding-- therefor Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*